Feb. 9, 1954
F. R. WILSON
2,668,440
HYDROMETER
Filed March 20, 1948
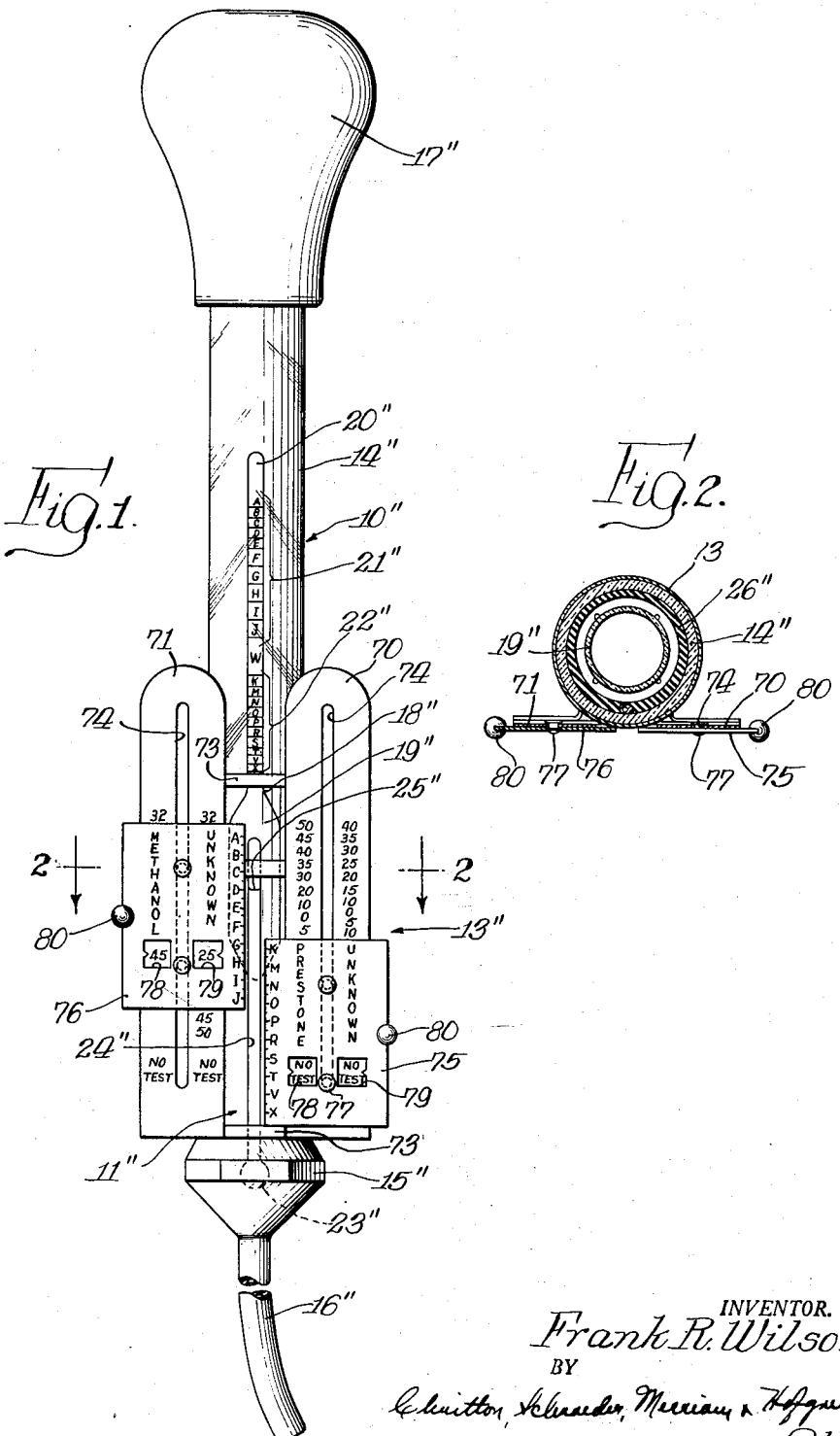
INVENTOR.
Frank R. Wilson,
BY Patented Feb. 9, 1954

2,668,440

UNITED STATES PATENT OFFICE 2,668,440

HYDROMETER

Frank R. Wilson, Lexington, Ky.

Application March 20, 1948, Serial No. 16,027

4 Claims. (Cl. 73—34)

The invention relates generally to hydrometers and more particularly to a hydrometer adapted for testing the coolant in the cooling system of an internal combustion engine to determine what freezing temperature the coolant can withstand.

One object of the invention is to provide a testing device of new and improved construction, particularly adapted to indicate quickly and conveniently, yet accurately, the freezing temperature, already corrected to take into account the temperature of the fluid being tested, which the fluid being tested will withstand.

Another object of the invention is to provide a testing device constructed in a new and improved manner to give an accurate reading, corrected as to the temperature of the fluid being tested, when the "make" of antifreeze compound in the fluid is known and to give a safe reading when the "make" of antifreeze compound is not known.

Still a further object is to provide a device adapted to test the freezing temperature that a solution will withstand having means including a float carrying a pair of separate scales indicating the specific gravity of the solution, a thermometer for indicating the temperature of the solution, and means for translating the specific gravity and the temperature indications into a measure of the freezing temperature that the solution will withstand including a pair of plates extending generally parallel with the temperature indicating means, each having a pair of graduated temperature value columns and an element mounted on each of said plates for sliding longitudinally thereof, the one bearing one of the scales and the other bearing the other of the scales on the float and having apertures therein indicating the freezing temperature which the solution being tested will withstand when the character indicating the specific gravity of the solution is placed opposite the temperature indication.

Other objects and advantages will become apparent from the following detailed description taken in connection with the accompanying drawings, in which:

Fig. 1 is an elevational view of an embodiment of my invention.

Fig. 2 is a transverse sectional view taken approximately along the line 2—2 of Fig. 1.

While the invention is susceptible of various modifications and alternative constructions, it is shown in the drawings and will hereinafter be described in three embodiments. It is not intended, however, that the invention is to be limited thereby to the specific disclosure made. On the contrary it is intended to cover all additional modifications and alternative constructions falling within the spirit and scope of the invention as defined in the appended claims.

As is well known to those versed in the art, the freezing temperature which a solution composed of water and some freezing-temperature-lowering compound will withstand, commonly the coolant employed in the radiator of an automoble, is determined by ascertaining the specific gravity of the solution and then correcting it to taken into account the effect of the temperature of the solution at the time the test was made. It is also known that there are antifreeze compounds, that is, freezing-temperature-lowering compounds which when added to water result in a solution having a specific gravity greater than that of water, and others which result in a solution having a specific gravity less than water. Moreover, each of the compounds now on the market produces a different freezing temperature which the solution may withstand, even though the specific gravity reading of the solution may be the same. It has thus in the past been necessary for a filling station or garage attendant, in testing the solution in a radiator, to measure or receive an indication of the specific gravity of the solution and the temperature of the solution, then go to a chart posted on a bulletin board and laboriously determine from the chart the indicated freezing temperature which the solution will withstand provided he knew definitely and specifically the specific antifreeze compound which was in the radiator. If he did not know what compound was in the radiator, it was only through laborious use of a plurality of charts that he could indicate a freezing temperature that the solution would withstand with safety and, if there was a mixture of compounds, the attendant was more or less completely at a loss to indicate what freezing temperature the solution could withstand.

It is to facilitate this determination of the freezing temperature which a solution will withstand that I have perfected the testing devices herein disclosed and claimed. Generally, these devices comprise means for obtaining an indication of the specific gravity of the solution being tested, means for obtaining an indication of the temperature of the solution, and means mounted on and carried by the device operable quickly and conveniently yet accurately to translate these indications of the specific gravity and the temperature into a measure or indication of the freezing temperature which the solution will withstand. The translating means is, however, so correlated with the temperature indicating means that the top of the column of temperature responsive fluid is employed directly in the determination of the freezing temperature of the solution, as distinguished from the necessity of reading from the temperature indicating means some numerical value or even some arbitrary relative temperature indicating character which must then be coordinated with some equivalent character on a different scale. Moreover, the translating means is so devised that, if it is known that the solution contains any one of four common antifreeze compounds, a definite indication of the freezing temperature of the solution is given and, if the compound is unknown, or if there is a mixture of compounds of the same class, that is, those having a specific gravity heavier than water, or those having a specific gravity lighter than water, a reading as to a safe freezing temperature is given.

As shown in Figs. 1 and 2, the testing device comprises means 10″ for obtaining an indication of the specific gravity of the solution, means 11″ for obtaining an indication of the temperature of the solution, and means 13″ for translating the specific gravity and the temperature indications into a measure of the freezing temperature which the solution will withstand. The specific gravity indicating means 10″ and the temperature indicating means 11″ are more or less of conventional construction, with the former comprising a tube, a cylinder, or a barrel 14″ of glass or some other suitable transparent material. At one end, the lower end as viewed in Fig. 1, the tube 14″ is seated in a base or tip 15″ usually of rubber or an equivalent material. This base has formed integrally therewith a long flexible rubber tube 16″ adapted to be inserted into the radiator or other container in which the solution to be tested is contained. At its opposite end, the tube 14″ carries a bulb 17″ utilized in well known manner to draw the solution to be tested into the barrel 14″ or to discharge the same therefrom. Within the barrel 14″ is a float 18″ composed of the usual enlarged or bulb portion 19″ and stem 20″, the float being received in the barrel 14″ with its bulb portion 19″ toward the inlet end of the barrel. Herein the stem of the float carries two scales 21″ and 22″ of generally similar nature save that they are composed of different characters. The characters composing the scales herein are letters, though, obviously, any other characters would serve the purpose and the scales are arranged in tandem relation along the stem and divided by a space bearing the character W which, of course, indicates a solution having the specific gravity of water. The scales are graduated with the characters falling closer together as one progresses away from the character W.

The temperature indicating means 11″ is a simple thermometer having a bulb 23″ and a capillary tube 24″. The bulb 23″ is disposed so as to be exposed to the solution drawn into the barrel 14″ to be tested, while the tube 24″ extends upwardly from the base 15″ within but immediately adjacent to the inner surface of the barrel 14″, so as to be clearly visible through the barrel. Contained in the thermometer is a suitable temperature responsive fluid 25″. The thermometer is supported in position by having a part of the tube 24″ embedded in the base 15″ and is further supported in position by means of a rubber sleeve 26″ which lines the lower portion of the barrel 14″. As best seen in Fig. 2, this sleeve 26″ almost completely surrounds the tube 24″ of the temperature indicating means and thus protects the tube against breakage by striking of the float thereagainst, and also prevents solution from surrounding the tube 24″ thereby producing enhanced readability of the temperature indicating means by eliminating the diffraction which would otherwise be produced by the solution.

When solution to be tested is drawn into the barrel 14″, the float, of course, seeks a level in the solution determined by the specific gravity thereof. If the solution is simply water, the float will sink to the point where the level of the solution will be opposite the space bearing the character W. If the solution contains an anti-freeze compound which has a specific gravity heavier than water the float will, of course, rise in the solution and give a reading on the scale 22″ depending upon the quantity of antifreeze compound of that character which has been added. Conversely, if the antifreeze compound has a specific gravity less than water, the float will sink deeper into the solution and give a reading on the scale 21″. Thus the position of the float in and of itself indicates to the attendant whether he is dealing with a solution containing a compound having a specific gravity less than water or a compound having a specific gravity greater than water, as does also the scale from which the reading is taken.

The translating means 13″ herein comprises three main parts, two of which are movable, but only one of which need be moved to obtain an indication as to the freezing temperature which a solution being tested will withstand. The stationary part of the translating means 13″ takes the form of a pair of elongated tablets 70 and 71 extending longitudinally of the barrel 14″ and rigidly secured in position by a pair of clamps 73 surrounding the barrel 14″ as best seen in Fig. 2. Formed in each of the tablets 70 and 71 is a narrow elongated and longitudinally extending slot 74. Alongside of the slot 74 are two columns of figures representing Fahrenheit temperatures. These figures range from a temperature of 32° F. to 40° or 50° below zero and it is to be noted that the numbers composing the columns on the tablet 70 run in the opposite direction from the numbers composing the columns on the tablet 71. In the commercial construction of the device, the above zero numbers and the below zero numbers are presented in contrasting colors with the below zero figures usually shown in red, but no attempt has here been made to indicate such difference in coloring the below zero figures being readily recognized from the location of the numerals 32. As in the other forms, the left hand one of the columns on each of the tablets 70 and 71 represents the freezing temperatures which a solution containing varying amounts of a known antifreeze compound will withstand. The right hand column of figures, on the other hand, is so calibrated as to give a safe reading when the antifreeze compound in the solution is unknown.

The movable parts of the translating means 13″ comprise two rectangular plates 75 and 76. The plate 75 is, as by a pair of rivets 77 extending through the slot 74, mounted for sliding movement longitudinally of the tablet 70 while the plate 76 is similarly mounted on the tablet 71. Each of the plates is formed with a pair of apertures 78 and 79 so located that they register with the columns of figures on the tablets 70 and 71. Along its inner side edge, the plate 75 carries a scale which corresponds to the scale 22" and along its inner side edge the plate 76 has a scale corresponding to the scale 21". The inner edges of the plates are located as closely adjacent the tube 24" of the thermometer as the barrel 14" permits so that the plates 75 and 76 may readily be adjusted with respect to the height of the column of temperature responsive fluid 25". To facilitate movement of the plates 75 and 76, each is provided with a finger grip 80. It will be appreciated, of course, that the various columns of figures, scales, and the column of temperature responsive fluid are so calibrated and positioned that when the plate 75 or the plate 76 is adjusted to have the letter on the scale thereon, corresponding to the specific gravity reading obtained from the float 18", opposite the top of the column of temperature responsive fluid, the number visible in the apertures 78 or 79 will be an indication of the freezing temperature which the solution being tested will withstand corrected to take into account the temperature of the solution at the time of the test.

While it is believed that the operation of the device will be readily apparent from the foregoing description, a brief statement thereof may be helpful. Let it be assumed, therefore, that a solution is to be tested which is known to be composed of water and a known antifreeze compound sold in the trade under the name "Prestone." Let it also be assumed that the temperature of the solution is as indicated by the column of temperature responsive fluid 25" in Fig. 1, and that the specific gravity of the solution is such that the float rides in the solution to give a reading of N. Thus by the simple operation of drawing a quantity of the solution into the barrel 14" the above recited information will be given to the attendant. All the attendant need do to obtain an indication of the freezing temperature which that solution will withstand is to adjust the plate 75 so that the character N is opposite the top of the column of temperature responsive fluid 25". He then looks to the aperture 78 in the plate 75 and framed in that aperture will be a number or numbers which will indicate the lowest temperature which the solution will withstand without freezing. Because the figures are hidden by the present position of the slide 75, an exact determination is not possible from the drawings, but it would appear that the reading would be somewhere in the neighborhood of 12° above zero. If it be assumed that the antifreeze compound in the solution is unknown, or if there is a mixture of compounds of the same general class, a safe reading is quickly and readily obtained by following the same procedure save that the figure appearing in the aperture 79 is used. This is possible because, as above pointed out, the right hand column on each of the tablets 70 and 71 is so scaled that it gives for any specific gravity of the solution the highest temperature taking into account any and all known antifreeze compounds.

If the solution contains a lighter than water antifreeze compound, the float reading, of course, will be on the scale 21". The procedure, however, is the same and still requires only adjustment of the plate 76 to bring the character on the plate, corresponding to the reading on the float, opposite the top of the column of temperature responsive fluid 25". If it be assumed that the solution gives a float reading of D which is well upon the scale 21", indicating a large content of antifreeze compound, and if the compound is known to be methanol, the attendant simply adjusts the plate 76 to the position shown, namely, with the letter D opposite the top of the column 25" and then looks to the aperture 78 and finds that the solution will withstand a temperature of 45° below zero. If the compound in the solution is unknown, or if it is known to consist of a variety of compounds, the attendant can immediately learn of a safe figure by noting the number in the aperture 79 which, as shown, is only 25° below zero.

I claim as my invention:

1. A device for determining the temperature at which a solution will freeze comprising means for obtaining an indication of the specific gravity of the solution including a tube into which the solution to be tested is drawn and a float within said tube having thereon separate scales respectively indicating the specific gravity of heavier than water solutions and lighter than water solutions, means for obtaining an indication of the temperature of the solution including a column of temperature responsive fluid extending longitudinally of said tube and a bulb exposed to the solution drawn into the tube, and means for translating the specific gravity indication and the temperature indication into a measure of the freezing temperature which the solution will withstand comprising a first part fixed on said tube, a second part composed of a pair of plates each mounted for movement longitudinally of said tube and longitudinally relative to said first part and to said column of temperature responsive fluid, the scale on one of said plates corresponding to specific gravity indications lighter than water and the scale on the other of said plates corresponding to specific gravity indications heavier than water, a plurality of columns of figures representing temperatures carried by said first part, said columns extending generally longitudinally of said tube, said scales and said columns being calibrated to give an indication corrected as to the temperature which the solution will withstand by adjusting the appropriate one of said plates to have the character on its scale corresponding to the specific gravity indication disposed opposite the top of the column of temperature responsive fluid.

2. A device for determining the temperature at which a solution will freeze comprising means for obtaining an indication of the specific gravity of the solution including a tube into which the solution to be tested is drawn and a float within said tube, a plurality of scales extending longitudinally in tandem relationship on the stem of said float, means for obtaining an indication of the temperature of the solution including a column of temperature responsive fluid extending longitudinally of said tube and a bulb exposed to the solution drawn into the tube, and means for translating the specific gravity indication and the temperature indication into a measure of the freezing temperature which the solution will withstand comprising a first part fixed on said tube and through which said column of temperature responsive fluid is visible, a second part composed of a pair of plates each mounted for movement longitudinally of said tube and longitudinally relative to said first part and to said column of temperature responsive fluid, a scale on the edge of each of said plates adjacent the column of temperature responsive fluid corresponding to one of the scales on said float, the scales on said plates and the scales on said float having the characters composing the same running in the same direction, a plurality of columns of figures representing temperatures carried by said first part, said columns extending generally longitudinally of said tube and grouped to be associated with one or the other of said plates, the figures of one of the groups of columns running downwardly from freezing to low temperature values and the figures of the other group of columns running downwardly from low temperatures to freezing temperature, said scales and said columns being calibrated to give an indication corrected as to the temperature which the solution will withstand by adjusting the appropriate one of said plates to have the character on its scale correspond to the specific gravity indication disposed opposite the top of the column of temperature responsive fluid.

3. A device for determining the freezing temperature which a solution will withstand comprising a tube into which the solution to be tested is drawn, a float within said tube, a pair of scales carried by the stem of said float, the one indicating specific gravities lighter than water, the other specific gravities heavier than water, means for obtaining an indication of the temperature of the solution including a column of temperature responsive fluid extending longitudinally of said tube and a bulb exposed to the solution drawn into the tube, and means for translating the specific gravity indication and the temperature indication into a measure of the freezing temperature which the solution will withstand comprising a pair of elongated tablets fixedly mounted on said tube extending longitudinally thereof, a plate mounted on each of said tablets for sliding movement longitudinally thereof, a pair of columns of temperature indicating figures on each of said tablets, each of said plates having a pair of apertures formed therein through which the figures of said columns are visible as the plates are adjusted longitudinally of said tablets, and a scale on each of said plate adjacent said column of temperature responsive fluid, the scale on one of said plates corresponding to the upper scale on said float and the scale on the other of said plates corresponding to the lower scale on said float, said scales and columns being so calibrated that when the appropriate plate is adjusted to have the character of its scale corresponding to the specific gravity of the solution disposed opposite the top of the column of temperature responsive fluid an indication as to the temperature which the solution will withstand is obtained by reading the figures within the apertures of said particular plate.

4. A device for determining the temperature at which a solution will freeze comprising means for obtaining an indication of the specific gravity of the solution including a tube into which the solution to be tested is drawn and a float within said tube having thereon a scale indicating the specific gravity of heavier than water solutions and lighter than water solutions, means for obtaining an indication of the temperature of the solution including a column of temperature responsive fluid extending longitudinally of said tube and a bulb exposed to the solution drawn into the tube, and means for translating the specific gravity indication and the temperature indication into a measure of the freezing temperature which the solution will withstand comprising a first part fixed on said tube, a second part composed of a pair of plates each mounted for independent movement longitudinally of said tube and longitudinally relative to said first part and to said column of temperature responsive fluid, a scale on one of said plates corresponding to the specific gravity indications for lighter than water solutions on said float, and a scale on the other of said plates corresponding to the specific gravity indications of heavier than water solutions on said float, a plurality of temperature scales carried by said first part, said temperature scales extending generally longitudinally of said tube, said specific gravity indication scales and said temperature scales being calibrated to give an indication corrected as to the temperature which the solution will withstand by adjusting the appropriate one of said plates to have the character on its scale corresponding to the specific gravity indication read from said float disposed opposite the top of the column of temperature responsive fluid.

FRANK R. WILSON.

References Cited in the file of this patent

UNITED STATES PATENTS

| Number | Name | Date |
|---|---|---|
| 2,018,441 | Edelman | Oct. 22, 1935 |
| 2,288,560 | Webber | June 30, 1942 |
| 2,297,186 | Hoyer | Sept. 29, 1942 |
| 2,331,542 | Edelman | Oct. 12, 1943 |
| 2,368,123 | Edelman | Jan. 30, 1945 |